Dec. 4, 1951 — W. W. KELLY — 2,577,527
COMBINED PITTING AND SLICING MECHANISM
Filed Jan. 8, 1947 — 2 SHEETS—SHEET 1
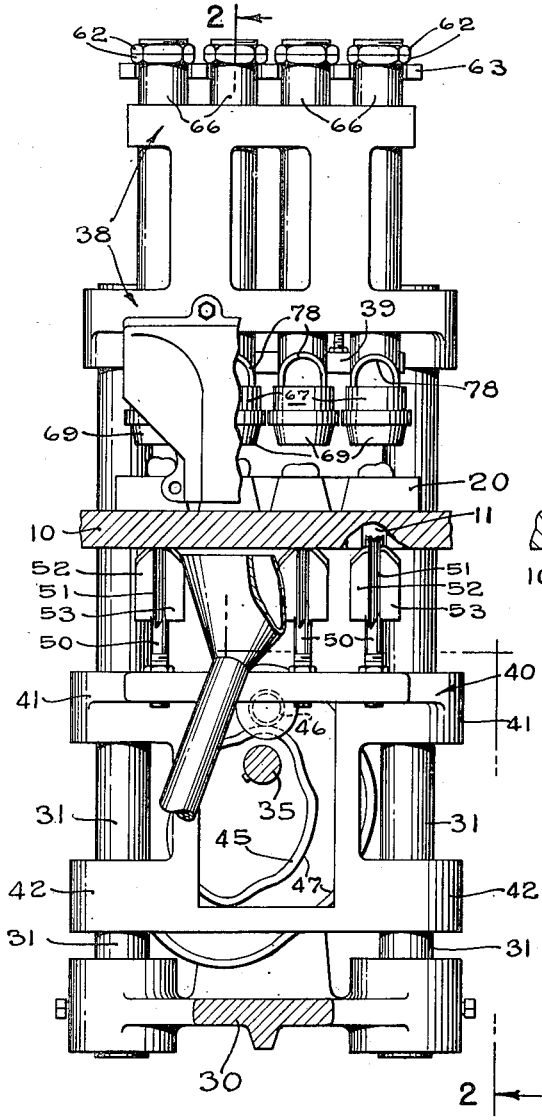
FIG_1
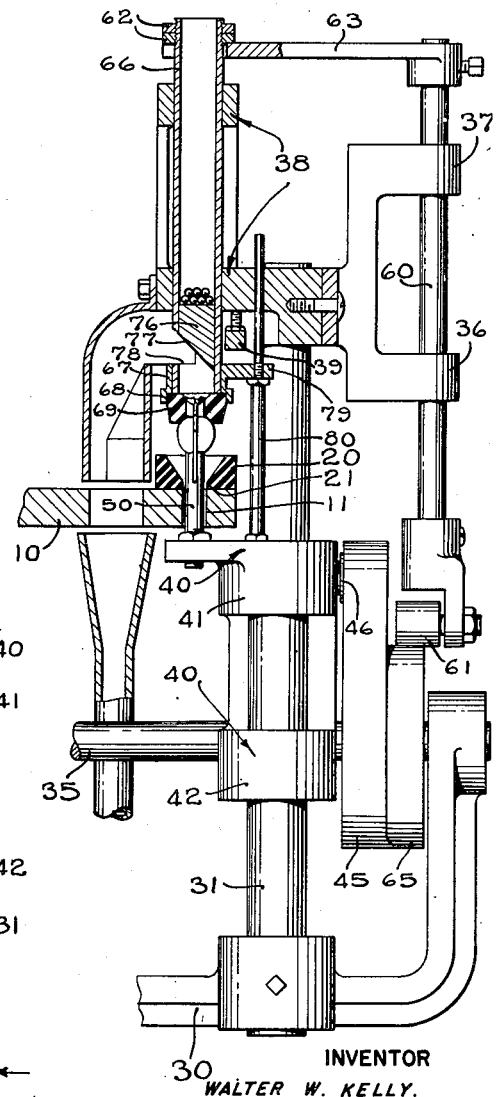
FIG_2
INVENTOR
WALTER W. KELLY.
BY Philip A. Minnis
Hans G. Hoffmeister
ATTORNEYS Dec. 4, 1951            W. W. KELLY            2,577,527
COMBINED PITTING AND SLICING MECHANISM
Filed Jan. 8, 1947            2 SHEETS—SHEET 2
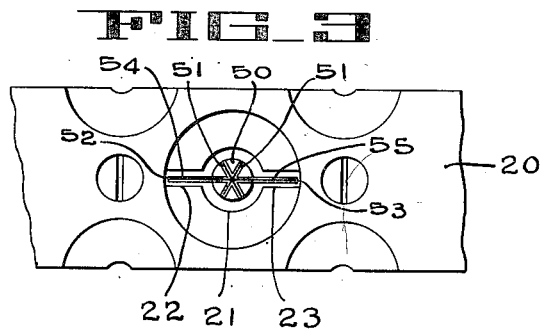
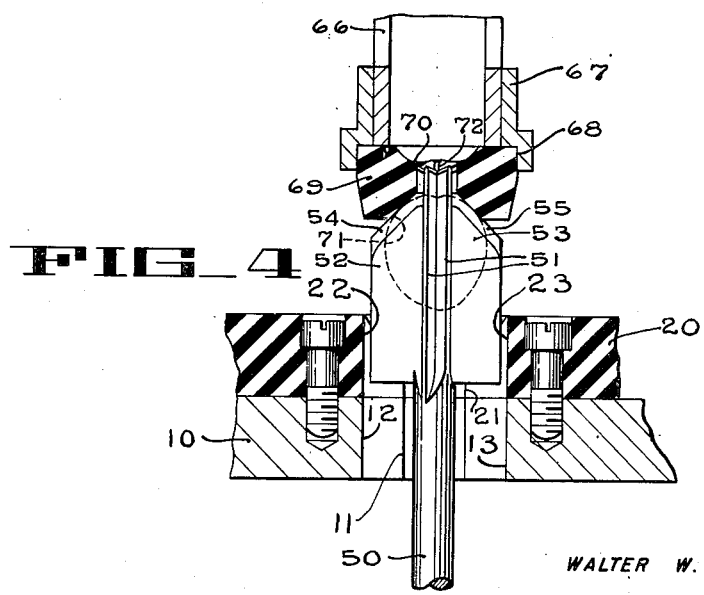
INVENTOR
WALTER W. KELLY.
BY Philip A. Minnis.
Hans G. Hoffmeister.
ATTORNEYS Patented Dec. 4, 1951

2,577,527

UNITED STATES PATENT OFFICE 2,577,527

COMBINED PITTING AND SLICING MECHANISM

Walter W. Kelly, Portland, Oreg., assignor to Food Machinery and Chemical Corporation, a corporation of Delaware Application January 8, 1947, Serial No. 720,748

5 Claims. (Cl. 146—18)

The present invention relates to devices and mechanisms employed in preparing cherries and like fruit for human consumption.

It is general practice nowadays to remove the pits of cherries and like fruit whether they are prepared for immediate consumption or preserved for use at a later date, and for certain special purposes such as fruit cocktails, salads, fruit cakes and the like it is often preferable to use cherries and like fruit sliced into halves, not only for reasons of appearance but also for reasons of economy because cherries form frequently the most costly ingredient of dishes of the type mentioned.

It is one of the objects of the present invention to provide a simple and efficient slicing device for cherries and like fruit.

More specifically, it is an object of the present invention to provide a device adapted to pit and slice a cherry or like fruit in a single operation.

It is another object of the present invention to provide a combined pitting and slicing device for cherries and like fruit which is of such simple construction that it may readily form part of either a manually operated contrivance or a complex motor-driven food preparing machine.

It is still another object of the present invention to provide mechanism for automatically operating a device of the type referred to.

These and other objects of my invention will be apparent from the following description of the accompanying drawing, which illustrates a preferred embodiment of my invention as part of an automatic food preparing machine and wherein:

Fig. 1 is a rear elevation partly in section, of a machine embodying my invention;

Fig. 2 is a side elevation thereof with certain parts of the mechanism shown in section;

Fig. 3 is a plan view of a fruit supporting cup; and a pitting and slicing tool associated therewith.

Fig. 4 is a detail view, in section, of the pitting and slicing device proper shown in a position wherein a cherry has been sliced into its halves and its pit has been ejected.

Referring to Figs. 1 and 2, numeral 10 designates part of a table upon which is mounted a row of cups 20. Table 10 may be stationary or it may be part of an intermittently moving conveyor line. As shown in Fig. 1, a cherry is seated in every cup where it may have been placed by hand or may have been fed automatically by a suitable feeding device at a preceding station of the conveyor line. The inner surface of each cup has the form of an inverted cone or crater and is provided with a central opening 21 at the bottom thereof, which coincides with a like opening 11 extending through table 10. Two diametrically opposite radial slots 22 and 23 extend vertically through the crater walls of the cup 20 and coinside with two corresponding slots 12 and 13 extending radially from opening 11 through table 10. Cups 20 are rigidly secured to table 10 in any suitable manner such as by screw means and may be constructed of any suitable material, for instance, hard rubber, wood, or non-rusting metal.

The pitting mechanism, in accordance with my invention, comprises a stationary frame 30 provided with two vertically disposed guide rods 31, each of which is slidably embraced by a pair of lateral guide loops 41 and 42 of a vertically movable supporting bracket 40. A row of combined pitting and slicing tools 50 are rigidly mounted upon bracket 40 (Fig. 1) in vertical axial alignment with the previously described openings 11 and 21 through table 10 and supporting cups 20, respectively.

The operating end of each tool 50 is composed of a plurality of vertically extending narrow blades 51 arranged radially around a common vertical axis, as shown in Figs. 3 and 4. The top ends of these blades 51 are sharpened to form cutting edges and are inclined toward the common center axis of the instrument to form a pocket adapted to receive a cherry pit, as may be seen from Fig. 4. In the embodiment illustrated in the drawing, tool 50 is shown as composed of six blades 51. It will be understood, however, that it may equally well be composed of three, four, five, seven or more such blades without departing from the scope of my invention.

Radially projecting from diametrically opposite sides of the tool described and somewhat below the top end thereof are two steel wings or fins 52 and 53, the upper ends of which are formed into inclined cutting edges 54 and 55 ascending toward the center axis of the instrument. The relative position of tools 50 and table 10 with fruit supporting cups 20 is such that fins 52 and 53 are vertically aligned with slots 12, 22 and 13, 23, respectively, in the table and the cups.

The vertical altitude of supporting bracket 40 with its tools 50 is controlled by a box cam 45. For this purpose a roller 46 pivoted to bracket 40 engages a camway or guide groove 47 in box cam 45. Box cam 45 in turn is keyed on a drive shaft 35 for rotation therewith, which may be operated from any suitable source of power such as an electric motor (not shown).

Likewise keyed upon drive shaft 35 for rotation therewith is a second cam 65 which controls the vertical position of a lifting rod 60 by engaging a cam follower roller 61 provided at the bottom end thereof. Rod 60 glides within two vertically aligned guide loops 36 and 37 which are rigidly supported from the upper end of the previously mentioned frame rods 31 as shown in Fig. 2. Lifting rod 60 carries a supporting bracket 63 which embraces slidably a series of tubular elements 66 that glide vertically within a guide frame 38. Guide frame 38 is also supported from the upper ends of frame rods 31 and is adapted to maintain each tubular element 66 in axial alignment with a cooperating pitting and slicing tool 50 projecting upwardly from movable supporting bracket 40 below. Means are provided in the form of nuts 62 engaging suitable threads in the upper ends of tubes 66 to limit downward sliding movement of said tubes, depending upon the position of lifting rod 60, while permitting the tubes to be moved upwards, disregarding the vertical adjustment of said lifting rod 60 and its supporting bracket 63.

The bottom end of each tube 66 is provided with an annular collar 67, rigidly attached thereto in any suitable manner and which forms an annular recess 68, as shown in Fig. 4, within which is seated a diaphragm 69 in the form of an inverted truncated cone of flexible material, such as rubber. Both the top and the bottom surfaces of truncated cone 69 have spherical depressions 70 and 71, respectively, which communicate with one another through a centrally positioned, narrow aperture or channel 72.

Somewhat above its lower end tube 66 is closed off by a plug 76 and lead shot or any other weighty material that will cause tube 66 to slide down within guide frame 38 and rest its recessed lower end upon a cherry seated in cup 20 under predetermined pressure, as soon as lifting rod 60 and its supporting bracket 63 permit such downward movement, may be employed. As shown in Fig. 2, the bottom surface 77 of plug 76 is inclined and obliquely faces an incision 78 provided laterally in tube 66 directly below, and vertically coextensive with the oblique surface 77 of plug 76.

In the mechanism described the vertical position of table 10 and fruit cups 20 mounted thereon is changeless while the vertical position of pitting tubes 66 and combined pitting and slicing tools 50 relative to one another and relative to fruit supporting cups 20, is determined by the contours of control cams 45 and 65 which, as previously mentioned, are both keyed upon drive shaft 35 for rotation in unison with one another.

Cam 65 has a single swell of short duration corresponding to inactive position of the mechanisms described in which the swell maintains tubes 66 at their uppermost position as shown in Fig. 1, providing sufficient space for cherries to be placed into cups 20, or for loaded cups to be slid underneath the lower ends of tubes 66. At this phase of the cycle of drive shaft 35, box cam 45 maintains supporting bracket 40 and combined pitting and slicing tools 50 in their lowermost positions in which blades 51 and fins 52, 53 are withdrawn from fruit supporting cups 20 and table 10, as likewise shown in Fig. 1.

As shaft 35 begins its operative cycle, cam follower roller 61 will drop from the solitary swell of control cam 65, permitting tubes 66 to descend with their concave bottom ends upon the cherries seated in cups 20 below, thus holding them in the cups disregarding their size. The corresponding sector of box cam 45 exhibits a gradual rise of its camway causing tools 50 to project through the openings 11 of the table 10 and enter the bottoms of cups 20 through the slots described so that the top edges of blades 51 will impale the bottoms of the cherries held down by the weight of pitting tubes 66, while the oblique cutting edges 54 and 55 of fins 52 and 53 will commence slicing the cherries into halves.

As soon as the upper end of each tool 50 comes against the pit of its cherry and grips said pit within the pocket formed by the inwardly inclined cutting edges of blades 51, the blunt top of the pit is substituted for the sharp cutting edges of tool 50 as the exponent of the upwardly directed force imparted by the continuing rise of camway 46 in box cam 45. Further upward movement of tool 50 will, therefore, lift the cherry out of cup 20 and slide tube 66 upwards until a stop lug 79, integral with tube collar 67, strikes against a stationary stop 39 mounted at an appropriate altitude on stationary frame 30, as shown in Figs. 1 and 2. As a result thereof, further upward movement of tube 66 and the cherry impaled upon tool 50 is positively halted.

Guide groove 47 of box cam 45, however, registers a further rise of accentuated steepness which forces tool 50, with the cherry pit gripped in its top end pocket higher into, and through the cherry and into and through the narrow channel 72, of flexible cone 69. During the first operation when a new diaphragm is employed, the tool 50 will cut its own passage into the same. From channel 72 the pit will be projected into the interior of tube 66 by the resiliency of the forcibly expanded channel walls where it will strike oblique wall 77 of plug 76 and be deflected through lateral incision 78 of tube 66 into a pit discharge chute that may be provided adjacent to incision 78, as shown in Figs. 1 and 2.

As tool 50 performs its final upward thrust in the manner described above, the sharp upper edges of fins 52 and 53 will completely sever the cherry into two halves. To assure complete severance of the cherry into two halves, the inclination of the cutting edges 54 and 55 of fins 52 and 53 should be such as to substantially conform with the wall of the depression 71 during the final part of the slicing operation. At the same time, a buffer rod 80 projecting upwardly from vertically movable supporting bracket 40, as shown in Fig. 2, and which is adapted to engage the underside of stop lug 79 on collar 67 from below, prevents such excessive upward movement of tool 50, relative to pitting tube 66 as might damage the diaphragm 69.

As cams 45 and 65 complete their cycles, the solitary swell of cam 65 will operate to retain the pitting tubes 66 at an altitude sufficient to permit replacement of the processed cherries, while a drop in camway 47 of box cam 45 in the final phase of its operative cycle, will act to withdraw tools 50 with their pitting and slicing blades from supporting cups 20 and table 10 leaving the cherries properly pitted and sliced in cups 20 from which they are subsequently discharged in any appropriate manner.

It will be understood that combined pitting and slicing tool 50 may be provided with three or more slicing fins instead of only two, as illustrated in the drawing, depending on the form and size of the fruit slices desired. It will also be understood, that the pitting and slicing device described may be fitted into manually operated appliances of such design that a single punching operation will take the place of the above described automatic movements controlled by drive shaft 35 and double cam construction 45 and 65.

While I have shown and described a preferred embodiment of my invention, such invention is capable of modification and variation without departing from the spirit and scope thereof, as defined in the claims appended hereto.

Having thus described my invention and the manner in which it is to be performed, what I claim is:

1. Mechanism for pitting and slicing cherries and like fruit including a tool comprising a vertical shaft composed of a plurality of radially arranged blades having sharpened and inwardly inclined upper ends, and a plurality of lateral fins projecting radially from said shaft at diametrically opposite sides thereof and terminating somewhat below the upper ends of said blades, each fin having a sharpened upper edge ascending obliquely toward said shaft; a support disposed above said tool to seat a cherry or like fruit and having a central opening and a plurality of slots radially extending therefrom in vertical axial alignment with said shaft and said fins respectively; vertically yieldable retaining means to hold a cherry or like fruit in said support regardless of its size; stop means to positively arrest yielding of said retaining means beyond a predetermined point vertically; and means for axially reciprocating said tool through said support.

2. Mechanism for pitting and slicing cherries and like fruit including a tool comprising a vertical shaft composed of a plurality of radially arranged blades having sharpened upper edges, said edges being inclined inwardly to form a central depression in the top of said shaft, and two lateral fins projecting radially from said shaft at diametrically opposite sides thereof, each having a sharpened upper edge obliquely ascending toward said shaft and terminating somewhat below the upper ends of said blades; a support disposed above said tool to seat a cherry or like fruit and having a central opening and two slots radially extending therefrom in vertical alignment with said shaft and said fins respectively; vertically yieldable retaining means mounted to overlie and to hold a cherry or like fruit in said support disregarding its size, stop means to positively arrest yielding of said retaining means away from said support at a predetermined point vertically, and means for axially reciprocating said tool through said support to a height to bring the upper edges of said blades into said retaining means and the sharpened upper edges of said fins into pressing contact with said retaining means to remove the pit and halve the flesh of said cherry or like fruit.

3. Mechanism for pitting and slicing cherries and like fruit including a tool comprising a vertical shaft composed of a plurality of radially arranged blades having inwardly inclined upper ends formed into cutting edges, two diagonally opposite ones of said blades being radially extended to form a pair of lateral fins of greater radial width than said blades, each having a sharpened upper edge obliquely ascending toward said shaft and terminating somewhat below the upper ends of said blades; a support positioned above said tool and having a central depression to seat a cherry or like fruit, and a central opening and two slots extending radially therefrom in vertical alignment with said shaft and said fins respectively; vertically yieldable retaining means comprising a centrally apertured dome of flexible material adapted to rest upon and hold a cherry or like fruit in said support disregarding its size; stop means to positively limit yielding of said retaining means away from said support at a predetermined point vertically, means for axially reciprocating said tool through said support; and buffer means to positively limit relative approach of said tool and said retaining means during operation of said tool.

4. A combined pitting and slicing tool for cherries and like fruit adapted for use with fruit retaining means, said retaining means having a cup recess for supporting the cherry against tool thrust and having an aperture for passing the pit, said tool comprising a support portion, and a pitting portion on said support portion, said pitting portion comprising a plurality of thin narrow pitting blades disposed along radial planes intersecting each other along a central axis, the terminal ends of said blades being sharpened and inclined inwardly toward their common axis of intersection to define a pit supporting cavity, two of said blades on opposite sides of said shaft being extended radially to form fins beginning at a point spaced rearwardly from the terminal ends of said blades, the fins being of a width to bisect a fruit being pitted by said pitting blades, the terminal ends of said fins being sharpened and shaped to conform to the cup recess in said retaining means.

5. A combined pitting and slicing tool for cherries and like fruit adapted for use with retaining means, said retaining means having a cup recess for supporting the cherry against tool thrust and having an aperture for passing the pit, said tool comprising a support portion, a pitting portion on said support portion including a plurality of thin narrow pitting blades disposed along radial planes intersecting each other along a central axis, the terminal ends of said blades being sharpened and inclined inwardly toward their common axis of intersection to define a pit supporting cavity, and a pair of thin fins on opposite sides of said axis and extending radially therefrom beginning at a point spaced rearwardly from the terminal ends of said blades, the fins being of a width to bisect a fruit being pitted by said pitting blades, the terminal ends of said fins being sharpened and adapted to cut through the fruit to the cup.

WALTER W. KELLY.

REFERENCES CITED

The following references are of record in the file of this patent:

UNITED STATES PATENTS

| Number | Name | Date |
|---|---|---|
| 250,794 | Donatella | Dec. 13, 1881 |
| 407,965 | Rosassco | July 30, 1889 |
| 2,059,163 | Wolff | Oct. 27, 1936 |
| 2,133,588 | Steinwand | Oct. 18, 1938 |
| 2,209,305 | Ashlock | July 30, 1940 |
| 2,373,101 | Polk et al. | June 12, 1945 |
| 2,403,516 | Gaddini | July 9, 1946 |
| 2,415,418 | Coons | Feb. 11, 1947 |

FOREIGN PATENTS

| Number | Country | Date |
|---|---|---|
| 484,201 | Germany | Oct. 12, 1929 |
| 564,872 | France | Oct. 30, 1923 |